United States Patent [19]

Yamada et al.

[11] Patent Number: 6,039,157
[45] Date of Patent: Mar. 21, 2000

[54] EDDY CURRENT BRAKING SYSTEM

[75] Inventors: Chuji Yamada; Shin Kobayashi; Makoto Ogawa; Tohru Kuwahara; Eiji Okumura, all of Kanagawa, Japan

[73] Assignee: Isuzu Motors Limited, Japan

[21] Appl. No.: 09/030,329

[22] Filed: Feb. 25, 1998

[30] Foreign Application Priority Data

Feb. 25, 1997 [JP] Japan .................................. 9-056849

[51] Int. Cl.⁷ ...................................................... B60L 7/00
[52] U.S. Cl. ............................................ 188/158; 188/164
[58] Field of Search ..................................... 188/158, 159, 188/161, 164, 264 G, 264 A, 267; 303/3, 5

[56] References Cited

U.S. PATENT DOCUMENTS 5,023,499  6/1991  Kuwahara .............................. 188/164
5,219,050  6/1993  Kubomiya .............................. 188/164
5,303,802  4/1994  Kuahara ................................. 188/164

FOREIGN PATENT DOCUMENTS 0 415 308 A2  3/1991  Japan .

*Primary Examiner*—Matthew C. Graham
*Assistant Examiner*—Mariano Sy
*Attorney, Agent, or Firm*—John E. Toupal; Harold G. Jarcho

[57] ABSTRACT

Magnets (20) are separated by ferromagnetic plates (21) from an inner surface of a brake drum (13) made of steel and secured to a rotational shaft (4). When the rotating brake drum (13) crosses magnetic flux generated by the magnets (20), a braking force caused by eddy currents is produced in the brake drum (13). An annular body (41) formed of a good conductor such as copper is fastened adjacent to at least one side surface of the brake drum (13) in a position axially spaced from the plates (21).

13 Claims, 5 Drawing Sheets

EDDY CURRENT BRAKING SYSTEM

BACKGROUND OF THE INVENTION

The present invention relates generally to an eddy current braking system for a rotational body such as a brake drum, and more particularly, to such a system using permanent magnets or electromagnets to enhance braking efficiency.

An eddy current braking system generates a braking force in response to the mutual action of magnetic fields applied by magnets to a brake drum via ferromagnetic plates and eddy currents generated by relative rotation between the magnets and the brake drum. If a material having a large permeability such as iron or steel and a material having large electric conductivity such as copper are combined in the brake drum, levels of eddy current and braking force increase.

In prior attempts to improve braking efficiency, a copper plate, a copper coating, electric conductive rods or a copper ring have been mounted on the outer surface of each ferromagnetic plate (pole piece), each permanent magnet, or on the inner surface of the brake drum. For example, as shown in FIG. 9, with a tubular body 46 made of copper is secured to the inner surface of a brake drum 13 made of steel, the braking force is increased to some extent. However, because of the poor heat transfer existing at the central portion of the inner surface of the brake drum 13, the adjacent central portion of the tubular body 46 experiences significant increases of temperature resulting in thermal deterioration and an accompanying problem in reliability. Specifically, since the copper constituting the tubular body 46 has a higher thermal expansion coefficient than that of the steel constituting the brake drum 13, high temperature at the central portion of the inner surface of the brake drum 13 causes peeling (separation) or cracking at the joint between the tubular body 46 and the brake drum 13.

In an attempt to overcome the foregoing problem there has been made an arrangement shown in FIG. 10 and disclosed in Japanese Utility Model Application Laid-Open No. Hei-4-111284 Publication. That system employs channel-shaped copper rings 47 fitted over both side surfaces of a brake drum 13. In addition, a plurality of axially directed electrically conductive rods 48 are disposed between the copper rings 47 to dissipate heat from the central portion of the brake drum 13. It has been found, however, that the temperature of the electrically conductive rods 48 are not significantly reduced nor is braking performance significantly enhanced. Particularly, in the case where the copper rings 47 are fitted over opposite end surfaces of the brake drum 13, a clearance existing therebetween increases electrical resistance and braking performance is not improved. Further, more undesirable high frequency noise is generated during braking operations. Even if the direction of the electric conductive rods 48 are inclined relative to the rotational axis of the brake drum 13 as disclosed in Japanese Utility Model Application Laid-Open No. Hei 3-874186 Publication, the high frequency noise is not completely eliminated.

SUMMARY OF THE INVENTION

In a braking system according to the present invention, there is provided a composite construction in which materials having a high electric conductivity such as copper are secured to opposite ends of a brake drum formed of an iron (steel) material having high permeability. To suppress a thermal deterioration of the material having high electric conductivity, to enhance braking torque and to reduce noise there is secured to at least one end of the brake drum an annular body formed of a good conductor such as copper and axially spaced from the edges of ferromagnetic plates positioned between an inner surface of the brake drum and an array of magnetic field generating permanent magnets.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
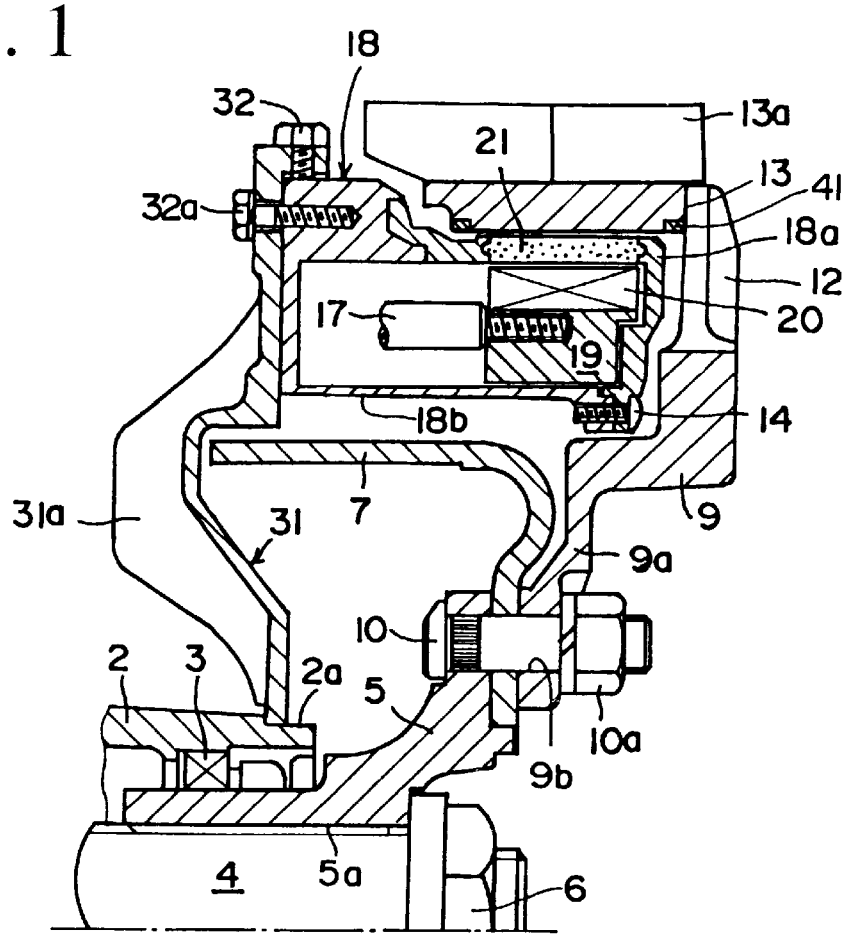
FIG. 1 is a transverse sectional view of an eddy current braking apparatus to which the present invention is applied.

In a magnet type eddy current reduction braking apparatus according to the present invention, a brake drum 13 is connected to a rotational shaft 4. A mounting flange 5 has a spline hole 5a fitted over a rotational shaft 4 which is supported on the end wall of a gear box 2 of a speed change gear by a bearing 3. Fastening the mounting flange 5 to an end wall is a nut 6. An end wall of a brake drum 7 of a parking brake and a flange portion 9a integral with a boss portion 9 of an eddy current reduction brake drum 13 are superposed and fastened to the flange 5 by a plurality of bolts 10 and nuts 10a.

The brake drum 13 has an inner surface straddled by first and second side surfaces and is formed of a material having a high permeability such as iron or steel, and a proximal end thereof is connected to a number of spokes 12 extending in a radial direction from the boss portion 9. A number of cooling fins 13a are integrally provided at uniform intervals on the outer peripheral wall of the brake drum 13.

A stationary guide tube 18 having an inner space in the sectional shape of a box is disposed coaxially within the brake drum 13. The guide tube 18 is formed of non-magnetic material and is secured by bolts 32, 32a to a frame plate 31 fitted over and secured to a projecting wall portion 2a of the gear box 2. Preferably, the guide tube 18 is fabricated by employing a number of bolts 14 to connect a left half tubular portion 18b having a channel-shape in section and formed of magnetic material such as iron to a right half tubular portion 18a having an inverted L shape in section and formed of a non-magnetic material such as aluminum. However, the guide tube 18 also may be fabricated by connecting annular end wall plates (not shown) to opposite ends of an outer peripheral wall portion 18a and an inner peripheral wall portion 18b.

The outer peripheral wall portion 18a of the guide tube 18 is opposed to the inner surface of the brake drum 13 and is provided with a number of uniformly spaced openings each retaining a ferromagnetic plate (pole piece) 21. Preferably, the ferromagnetic plates 21 are present when the outer peripheral wall portion 18a is cast of aluminum. The plates 21 of uniform axial width are arranged in an annular array radially aligned with a central portion of the inner surface of the brake drum 13.

A plurality of actuators (not shown) are supported at uniform intervals on the frame plate 31 having the reinforcing rib 31a. Each actuator has a piston fitted in a cylinder defining a pair of fluid pressure chambers, and a magnet support tube 19 is connected to an end of a rod 17 projecting into the inner space of the guide tube 18 from the pistons. The magnet support tube 19 is supported for axial movement within the guide tube 18. Permanent magnets 20 of circumferentially alternating polarity are connected to the outer peripheral wall of the magnet support tube 19.

Figure 2:
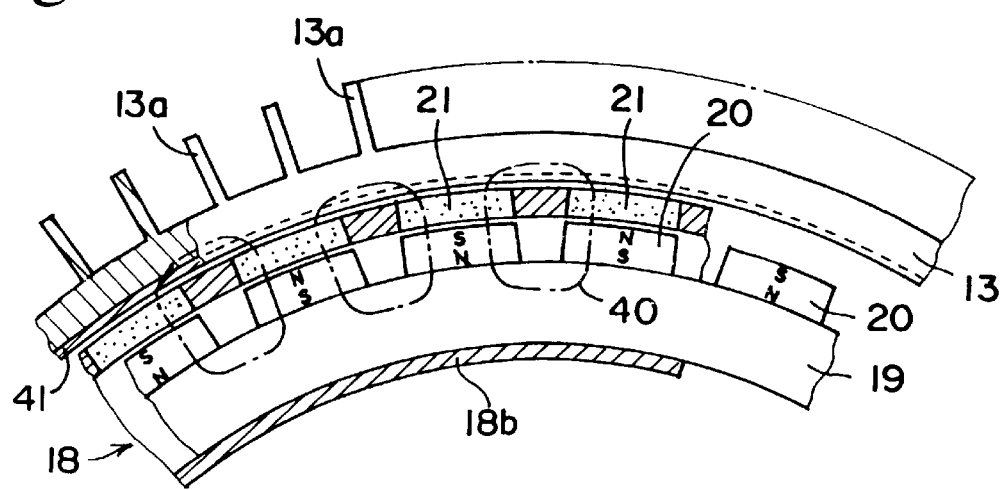
FIG. 2 is an axial sectional view apparatus shown in FIG. 1.

During braking, the magnet support tube 19 is moved into the brake drum 13 by the rod 17 as shown in FIG. 1. When the rotating brake drum 13 crosses the magnetic field directed from the magnets 20 to the inner surface of the brake drum 13 via the ferromagnetic plates 21, eddy currents are generated to produce a braking torque. The brake drum 13 is heated by the eddy current and cooled by the environmental air directly or through the cooling fins 13a. During this braking operation, magnetic circuits 40 are formed between the magnet support tube 19 and the brake drum 13 as shown in FIG. 2. Conversely, during non-braking periods, the magnet support tube 19 is withdrawn from the brake drum 13 to remove the magnetic field from the brake drum 13 and eliminate the braking torque. The level of braking force produced by the braking apparatus during relative rotation between the magnets 20 and the brake drum 13 is dependent on the strength of the generated eddy currents and magnetic fields.

Figure 3:
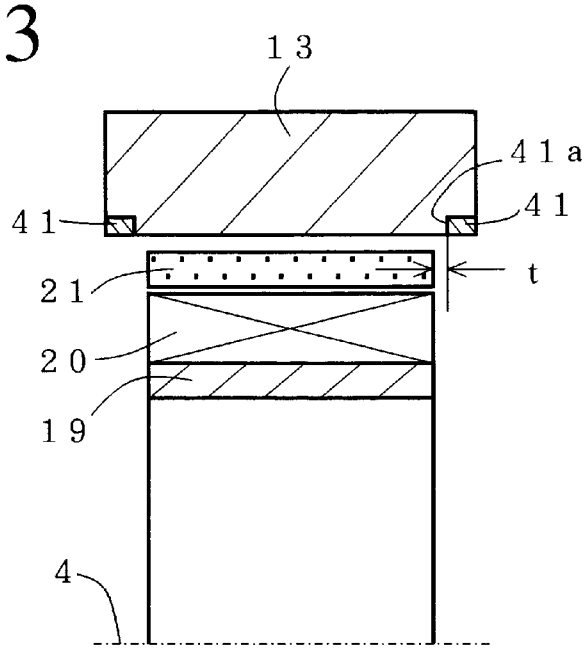
FIG. 3 is a transverse sectional view showing important components of an apparatus according to the present invention.

According to the present invention, shown in FIG. 3, annular body members 41 formed of a good conductor such as copper are provided, respectively, adjacent to the first and second side surfaces of the brake drum 13 formed of a material having a high permeability such as steel. The annular body members 41 are axially spaced by a substantial distance t from, respectively, axially spaced apart first and second edges of the plates 21 so as to suppress heat deterioration of the annular bodies 41, and to increase levels of eddy current and torque. For facilitating a flow of eddy currents between the brake drum 13 and the annular bodies 41, inner surfaces 41a of the annular bodies 41 are placed in close contact with surfaces of the brake drum 13 defined by annular slots formed at lower peripheral edges of the brake drum 13. The slots have transverse cross-sections conforming to the transverse cross-sections of the annular bodies 41. Preferably, the annular bodies 41 are bonded by, for example, deposition, copper-plating or copper-welding to the entire end surfaces 41a thereof joined to the brake drum 13. Alternatively, the brake drum 13 can be bonded by, for example, deposition, copper-plating or copper-welding to only the inner peripheral surface portions of the bodies 41.

Figure 4:
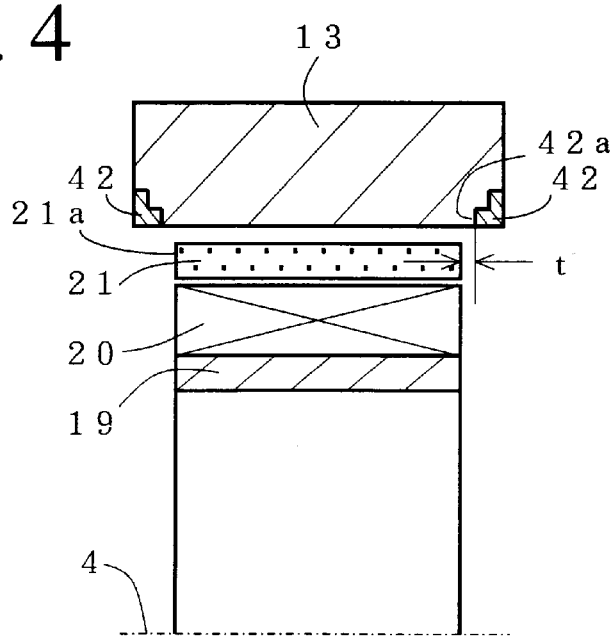
FIG. 4 is a transverse sectional view illustrating another embodiment of the invention.

In the embodiment shown in FIG. 4, annular bodies 42 made of, for example, copper and having L-shaped transverse cross-sections are secured to, respectively, L-shaped slots in opposite lower annular edges of the brake drum 13. The L-shaped cross-sections provide the annular bodies 42 with inner portions of greater width than their outer portions. Again, the inner end surfaces 42a of the annular bodies 42 are bonded by, for example, plating or welding to the brake drum 13. An axial clearance t is provided between the inner surfaces 42a of the annular bodies 42 and the opposite side edges 21a of the ferromagnetic plates 21. Thus, the annular bodies 42 are not superposed over the outer peripheral portions of the ferromagnetic plates 21.

Figure 5:
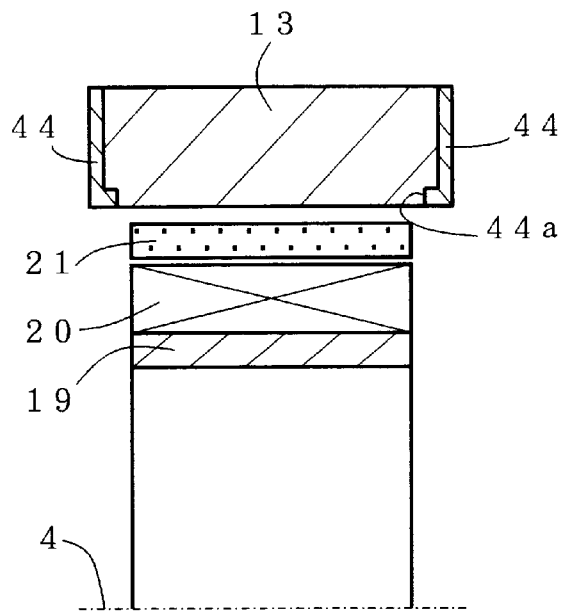
FIG. 5 is a transverse sectional view illustrating another embodiment of the invention.

In the embodiment shown in FIG. 5, a pair of annular bodies 44 made of copper having an L-shape in section is superposed on and connected to the opposite end surfaces of the brake drum 13 so that the annular body 44 covers the entire end surface of the brake drum 13. An inner end surface 44a on the inner peripheral portion of the annular body 44 is deposited, plated or welded, and also the outer peripheral portion of the annular body 44 is deposited, plated or welded. As in the embodiment of FIG. 4, the bodies have cross-sections with inner portions of greater width than their outer portions which are subjected to less heat. Accordingly, a desired reduction in material is obtained.

Figure 6:
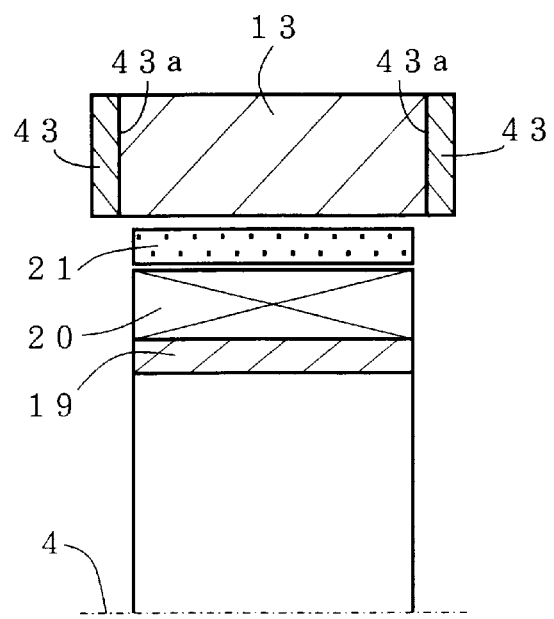
FIG. 6 is a transverse sectional view illustrating another embodiment of the invention.

In the embodiment shown in FIG. 6, a pair of plate-like annular bodies 43 of uniform thickness are superposed on and secured to, respectively, opposite side surfaces of the brake drum 13. Again, the inner end surfaces 43a of the annular bodies 43 preferably are bonded by, for example, deposition, plating or welding to the entire opposite side surfaces of the brake drum 13. Alternatively, only inner and the outer peripheral portions of the bodies can be bonded to the brake drum 13.

Figure 7:
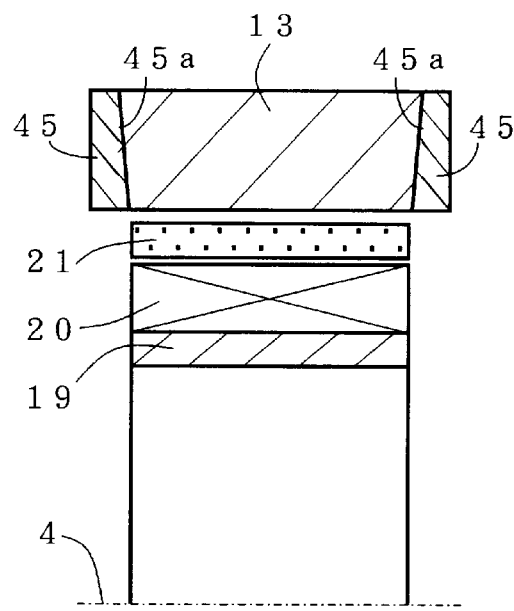
FIG. 7 is a transverse sectional view illustrating another embodiment of the invention.

In the embodiment shown in FIG. 7, a pair of tapered annular bodies 45 have inner peripheral portions of greater width than thinner outer peripheral portions. The bodies are superposed on and secured to, respectively, opposite side surfaces 45a of the brake drum 13. Again, outer peripheral portions which are lower in temperature are made thin to reduce material costs of the annular bodies 45.

Figure 8:
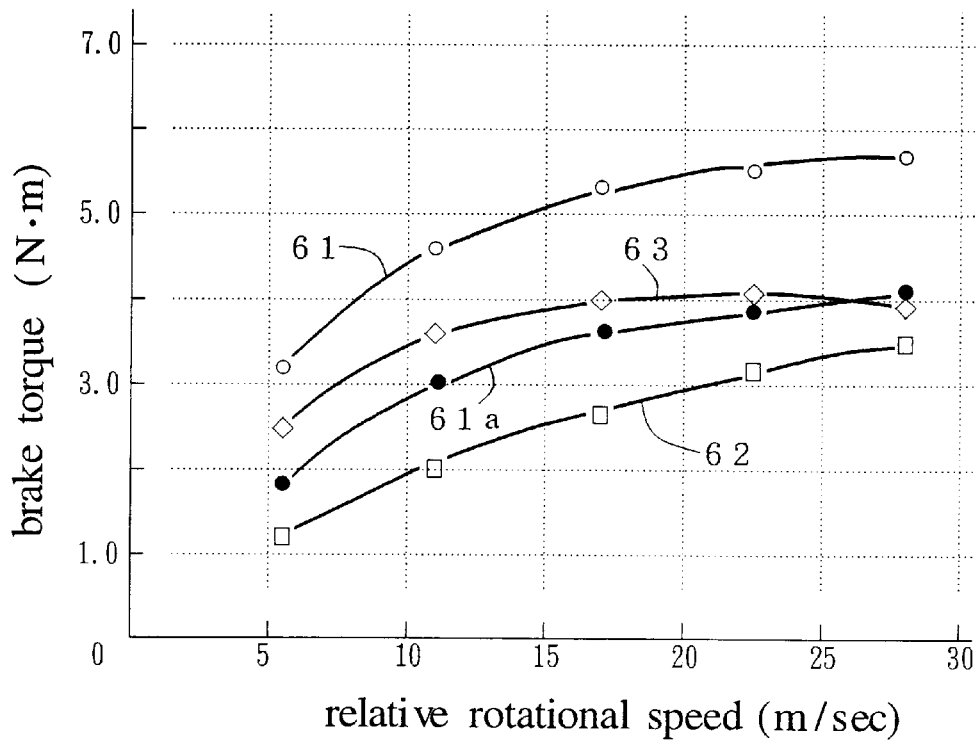
FIG. 8 is a diagram including curves comparing braking performance of the present invention with that of the prior art.
Figure 9:
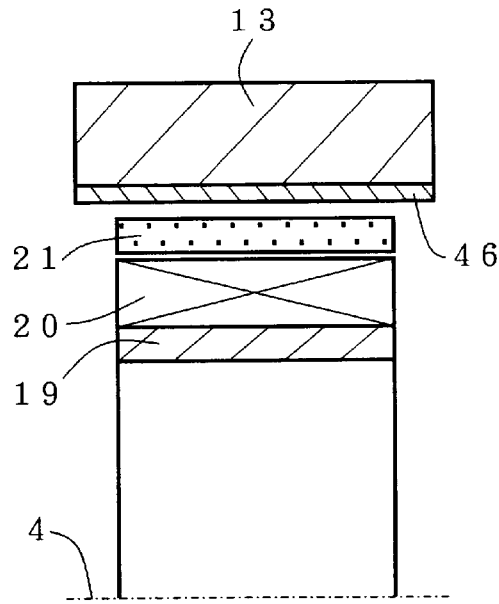
FIG. 9 is a transverse sectional view illustrating a conventional eddy current braking apparatus.
Figure 10:
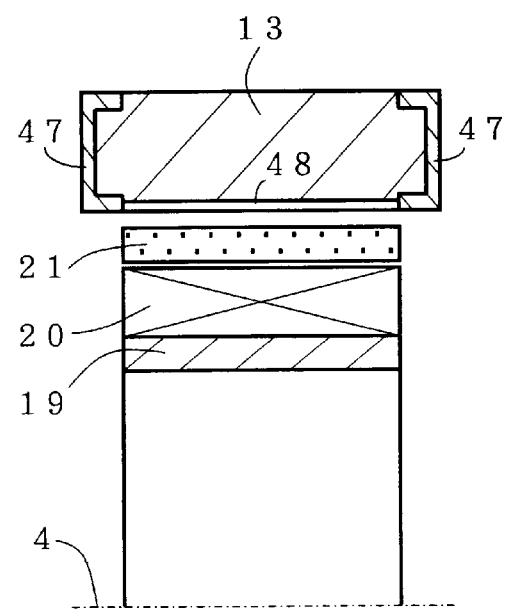
FIG. 10 is a transverse sectional view illustrating another conventional eddy current braking apparatus.

In the diagram of FIG. 8, curve 61 depicts further embodiment of FIG. 6, characteristics of generated braking torque versus brake drum rotational speed. Curve 61a shows characteristics of braking torque versus brake drum rotational speed for a device (not shown) having an annular body 43 secured to only one side surface of the brake drum 13 shown in FIG. 6. Curve 62 shows the characteristics braking torque versus brake drum rotational speed of a conventional brake drum 13 (not shown) having no annular bodies 43 as shown in FIG. 9. Finally, curve 63 shows the characteristics braking torque versus brake drum rotational speed for the brake drum 13 shown in FIG. 10.

As will be apparent from FIG. 8, in the arrangement wherein a copper layer is provided on the entire inner surface of the brake drum 13 (FIG. 9), and in the arrangement wherein electric conductive rods are provided on the entire inner surface of the brake drum 13 (FIG. 10), braking torque is saturated and ceases to increase in a high speed rotational region. Conversely, in the present invention, braking torque increases even in the higher rotational speed area. This enhancement of the braking torque is the result from the axial spacing of the annular bodies 41–45 from the opposite edges 21a of the ferromagnetic plates 21. That factor enhances the heat radiating properties of the bodies 41–45 as compared with those of the prior art. Since each ferromagnetic plate 21 constitutes a continuous body superposed on the steel brake drum 13 in terms of width or axial dimension, the annular bodies 41–45 restrain the magnetic flux passed through the ferromagnetic plate 21 from spreading or leaking beyond the opposite ends of the brake drum 13 and thereby reducing the level of magnetic flux. Also, since the annular bodies 41–45 form a good conductor at opposite ends of the brake drum 13, the path of eddy currents in an axial direction is reversed at the opposite ends of the brake drum 13. Furthermore, because the annular bodies 41–45 are bonded to the inner peripheral surface of the brake drum 13, current smoothly flows from the steel brake drum 13 to the copper annular bodies to facilitate flow of eddy current and enhance braking torque.

As described above, the present invention provides an eddy current reduction system for generating a magnetic braking force in a rotational body. The system includes a steel brake drum secured to a rotational shaft, a plurality of magnets separated from an inner surface of the brake drum by ferromagnetic plates, and an annular body formed of a good conductor such as copper secured adjacent to at least one side of the brake drum and axially spaced from the ferromagnetic plates. Therefore, the annular body enhances heat transfer characteristics to suppress thermal deterioration. Furthermore, since the ferromagnetic plates constitute a continuous body with the steel brake drum any reduction of magnetic flux is suppressed, and braking torque is enhanced. Preferably, the annular body is bonded to the surface of the brake drum by, for example, deposition of steel or copper materials, or by plating or welding techniques. The resultant close contact causes eddy currents to flow smoothly from the steel brake drum to the copper annular body and thereby enhance braking torque.

Because the annular body is good in thermal contact with the brake drum heat transfer from the inner portion of the brake drum is improved. In addition, since the annular body is isolated from central portion of the brake drum exposed to high temperature, the difference between the large coefficient of thermal expansion of the copper annular body and the small coefficient of thermal expansion of the steel drum are alleviated. Consequently, problems such as separation or cracking at the joint between the brake drum and the annular body are reduced. The elimination of electric conductive rods on the inner surface of the brake drum provides the additional advantage of braking noise reduction.

While in the aforementioned embodiment, description has been made of a permanent magnet type eddy current braking system in which a magnet support tube is axially reciprocated relative to the brake drum to switch between braking and non-braking positions, it is to be noted that the present invention is not limited thereto. The invention can be applied also to a permanent magnet eddy current braking system in which a single magnet support tube is rotated with respect to a brake drum to switch between braking and non-braking positions. Such a system is disclosed in Japanese Patent Application Laid-Open No. Hei 4-88867 Publication. The invention also can be applied to a permanent magnet eddy current braking system in which an immovable magnet support tube and a movable magnet support tube are disposed within a brake drum, and the movable magnet support tube is rotated to switch between braking and non-braking positions. That type of braking is disclosed in Japanese Patent Application Laid-Open No. Hei 4-12659 Publication. Furthermore, the present invention can be applied not only to permanent magnet 20 eddy current braking systems but also to electromagnet eddy current braking systems as disclosed in Japanese Patent Application Laid-Open No. 63-274359 Publication. The invention is not limited either to permanent magnet eddy current systems of a brake drum type. It can be applied also to a permanent magnet eddy current braking system of a brake disk type, or in certain systems electromagnets can be used in place of permanent magnets.

Obviously, therefore, many modifications and variations of the present invention are possible in light of the above teachings. It is to be understood, therefore, that the invention can be practiced otherwise than as specifically described.

What is claimed is:

1. Vehicle braking apparatus comprising:
   a brake drum secured to a rotational shaft; said drum having an inner surface and first and second side surfaces;
   magnetic field generating means annularly distributed within said brake drum;
   a plurality of ferromagnetic plates having axially spaced apart first and second edges and being disposed in an annular array between said magnetic field generating means and said inner surface of said brake drum, said first edges of said plates being radially and axially spaced from said first side surface of said brake drum; and
   an electrically conductive annular body having at least an annular portion bonded to a lower peripheral edge of said first side surface and along a continuous annular interface therebetween, said annular body being axially spaced from said first edges of said plates; and wherein said lower peripheral edge is formed by an annular slot in said brake drum and having an L-shaped transverse cross-section substantially conforming to a transverse cross-section of said annular portion.

2. An apparatus according to claim 1 wherein said annular body is spaced substantially from said first edges of said plates.

3. A vehicle braking apparatus comprising;
   a brake drum secured to a rotational shaft; said drum having an inner surface and first and second side surfaces;
   magnetic field generating means annularly distributed within said brake drum;
   plurality of ferromagnetic plates having axially spaced apart first and second edges and being disposed in an annular array between said magnetic field generating means and said inner surface of said brake drum, said first edges of said plates being radially and axially spaced from said first side surface of said brake drum; and wherein said plates are of uniform axial width and are radially aligned with a central portion of said inner surface;
   an electrically conductive annular body secured to said brake drum adjacent to said first side surface, said annular body being axially spaced from said first edges of said plates; and
   an electrically conductive annular member secured to said brake drum adjacent to said second side surface, said annular member being axially spaced from said second edges of said plates.

4. An apparatus according to claim 3 wherein said annular body and said annular member are of uniform cross-section.

5. An apparatus according to claim 4 wherein said annular member is bonded to said second side surface, and said annular body is bonded to said first side surface.

6. An apparatus according to claim 5 wherein at least an annular portion of said annular body is bonded to a lower peripheral edge of said first side surface, and at least an annular portion of said annular member is bonded to a lower peripheral edge of said second side surface.

7. An apparatus according to claim 6 wherein said lower peripheral edges are formed by annular slots in said brake drum.

8. An apparatus according to claim 6 wherein said annular body substantially covers said first side surface and said annular member substantially covers said second side surface.

9. An apparatus according to claim 8 wherein each of said annular body and said annular member have a cross-section with a lower portion of greater width than its upper portion.

10. An apparatus according to claim 3 including drive means for producing axial movement of said plates relative to said drum.

11. Vehicle braking apparatus comprising:

a brake drum secured to a rotational shaft; said drum having an inner surface and first and second side surfaces;

magnetic field generating means annularly distributed within said brake drum;

a plurality of ferromagnetic plates having axially spaced apart first and second edges and being disposed in an annular array between said magnetic field generating means and said inner surface of said brake drum, said first edges of said plates being radially and axially spaced from said first side surface of said brake drum; and an electrically conductive annular body having at least an annular portion bonded to a lower peripheral edge of said first side surface and along a continuous annular interface therebetween, said annular body being axially spaced from said first edges of said plates and substantially covering said first side surface; and wherein said annular body has a cross-section with an inner portion of greater width than its outer portion.

12. An apparatus according to claim 11 wherein said cross-section is L-shaped.

13. An apparatus according to claim 11 wherein said cross-section is tapered.

* * * * *